United States Patent
Surace (10) Patent No.: US 12,474,052 B1
(45) Date of Patent: Nov. 18, 2025

(54) DOVETAIL FEATURES ON PANEL RAILS OR IMPINGEMENT SHEET TO HOLD PANELS

(71) Applicant: RTX Corporation, Farmington, CT (US)

(72) Inventor: Raymond Surace, Newington, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/668,822

(22) Filed: May 20, 2024

(51) Int. Cl.
F23R 3/00 (2006.01)
F02K 1/82 (2006.01)
F23R 3/60 (2006.01)
F23R 3/06 (2006.01)

(52) U.S. Cl.
CPC .............. *F23R 3/002* (2013.01); *F02K 1/822* (2013.01); *F23R 3/60* (2013.01); *F23R 3/007* (2013.01); *F23R 3/06* (2013.01); *F23R 2900/00017* (2013.01); *F23R 2900/03044* (2013.01)

(58) Field of Classification Search
CPC .. F23R 3/002; F23R 3/60; F23R 3/007; F23R 3/06; F23R 2900/00017; F23R 2900/03044; F02K 1/822
See application file for complete search history.

(56) References Cited

U.S. PATENT DOCUMENTS

| | | | |
|---|---|---|---|
| 4,441,324 A * | 4/1984 | Abe | F23R 3/007 60/753 |
| 7,291,407 B2 | 11/2007 | Merrill et al. | |
| 9,903,589 B2 | 2/2018 | Hucker et al. | |
| 10,101,029 B2 | 10/2018 | Propheter-Hinckley et al. | |
| 10,563,865 B2 | 2/2020 | Chang | |
| 10,767,863 B2 * | 9/2020 | Freeman | F01D 9/04 |
| 11,215,367 B2 | 1/2022 | Kramer | |
| 2010/0199628 A1 * | 8/2010 | Berry | F23M 5/04 219/137 R |

(Continued)

FOREIGN PATENT DOCUMENTS

WO  2021121862 A1  6/2021

OTHER PUBLICATIONS

Extended European Search Report for EP Application No. 25177783.5, dated Aug. 29, 2025, 8 pages.

(Continued)

*Primary Examiner* — Gerald L Sung
*Assistant Examiner* — Rene D Ford
(74) *Attorney, Agent, or Firm* — Kinney & Lange, P.A.

(57) ABSTRACT

A gas turbine engine combustor panel assembly includes a shell defining an outer periphery of a combustion chamber. The shell has an outer skin with a first plurality of holes and a combustor panel, which includes a first end including a second plurality of holes on an inner face, which extend through the inner face to an outer face and are configured to allow fluid flow from the first plurality of holes to the combustion chamber. The combustor panel further includes a second end comprising a dovetail interface section extending axially from a central axis and from a panel wall of the combustor panel. The assembly further includes a plurality of dovetail tail connectors configured to extend along a central axis and interface with the second end of the combustor panel to connect the combustor panel to the shell.

16 Claims, 4 Drawing Sheets

(56) References Cited

U.S. PATENT DOCUMENTS

| | | | | |
|---|---|---|---|---|
| 2012/0125005 A1* | 5/2012 | Dierberger | ............... | F23R 3/60 |
| | | | | 60/753 |
| 2014/0023490 A1* | 1/2014 | Hillier | ..................... | F16L 19/00 |
| | | | | 415/173.6 |
| 2015/0260400 A1 | 9/2015 | Clemen | | |
| 2018/0252413 A1 | 9/2018 | Clemen et al. | | |
| 2019/0063749 A1 | 2/2019 | Zelesky et al. | | |
| 2019/0264923 A1 | 8/2019 | Kobayashi et al. | | |
| 2020/0003417 A1 | 1/2020 | Schlichting | | |
| 2020/0116356 A1 | 4/2020 | White | | |
| 2020/0355369 A1* | 11/2020 | Hu | ......................... | F23R 3/007 |
| 2022/0381434 A1 | 12/2022 | Moura et al. | | |
| 2023/0258336 A1 | 8/2023 | Ganiger et al. | | |
| 2023/0296251 A1* | 9/2023 | Sampath | ................ | F23R 3/007 |
| | | | | 60/753 |
| 2024/0133556 A1* | 4/2024 | Ganiger | ................. | F23R 3/002 |

OTHER PUBLICATIONS

Extended European Search Report for EP Application No. 25177726. 4, dated Aug. 22, 2025, 9 pages.

\* cited by examiner

DOVETAIL FEATURES ON PANEL RAILS OR IMPINGEMENT SHEET TO HOLD PANELS

BACKGROUND

The present disclosure relates to combustor panel assemblies, and in particular panel assemblies used on a gas turbine engine.

Gas turbine combustor panel assemblies are used to insulate engine components from combustion gases, which can reach temperatures exceeding 1,600 degrees Celsius. Engines may be made more efficient by increasing the combustor inlet and exit temperatures, but cooling components and insulating other components from the combustion chambers becomes more difficult. As such, combustor panels help insulate components of an engine outside of the combustion chamber from the high temperatures within.

Current combustor panels are mounted to an outer shell of the combustion chamber via mounting studs. However, mounting studs can result in localized hot spots on the combustor panels. In addition, dirt collection around the mounting studs can cause distress that results in unscheduled engine removals. A different mounting system without localized hot spots would help operate an engine at increased temperatures without adverse effects.

SUMMARY

In one example, a gas turbine engine combustor panel assembly includes a shell defining an outer periphery of a combustion chamber. The shell has an outer skin with a first plurality of holes and a combustor panel, which includes a first end including a second plurality of holes on an inner face, which extend through the inner face to an outer face and are configured to allow fluid flow from the first plurality of holes to the combustion chamber. The combustor panel further includes a second end comprising a dovetail interface section extending axially from a central axis and from a panel wall of the combustor panel. The assembly further includes a plurality of dovetail tail connectors configured to extend along a central axis and interface with the second end of the combustor panel to connect the combustor panel to the shell.

In another example, a combustor panel arrangement for use in a combustor in a gas turbine engine includes a shell defining a combustion chamber, the shell having an outer skin with a first plurality of holes and further including a first combustor panel with a first end including a second plurality of holes on an inner face of the first combustor panel through to an outer face of the first combustor panel, and configured to allow fluid flow from the first plurality of holes to the combustion chamber, and a second end comprising a dovetail interface section extending along central axis and from a panel wall of the first combustor panel. The shell further includes a second combustor panel with a first end including a second plurality of holes on an inner face of the second combustor panel through to an outer face of the second combustor panel, and configured to allow fluid flow from the first plurality of holes to the combustion chamber, and a second end comprising a dovetail interface section extending along central axis and from a panel wall of the second combustor panel. A plurality of dovetail tail connectors are configured to extend along the central axis and interface with the second end of the first combustor panel, and the second end of the second combustor panel.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

This disclosure presents a combustor panel assembly designed for use in a gas turbine engine. In particular, this disclosure involves attaching combustor panels to an outer skin of a combustion chamber via dovetail attachments.

Figure 1:
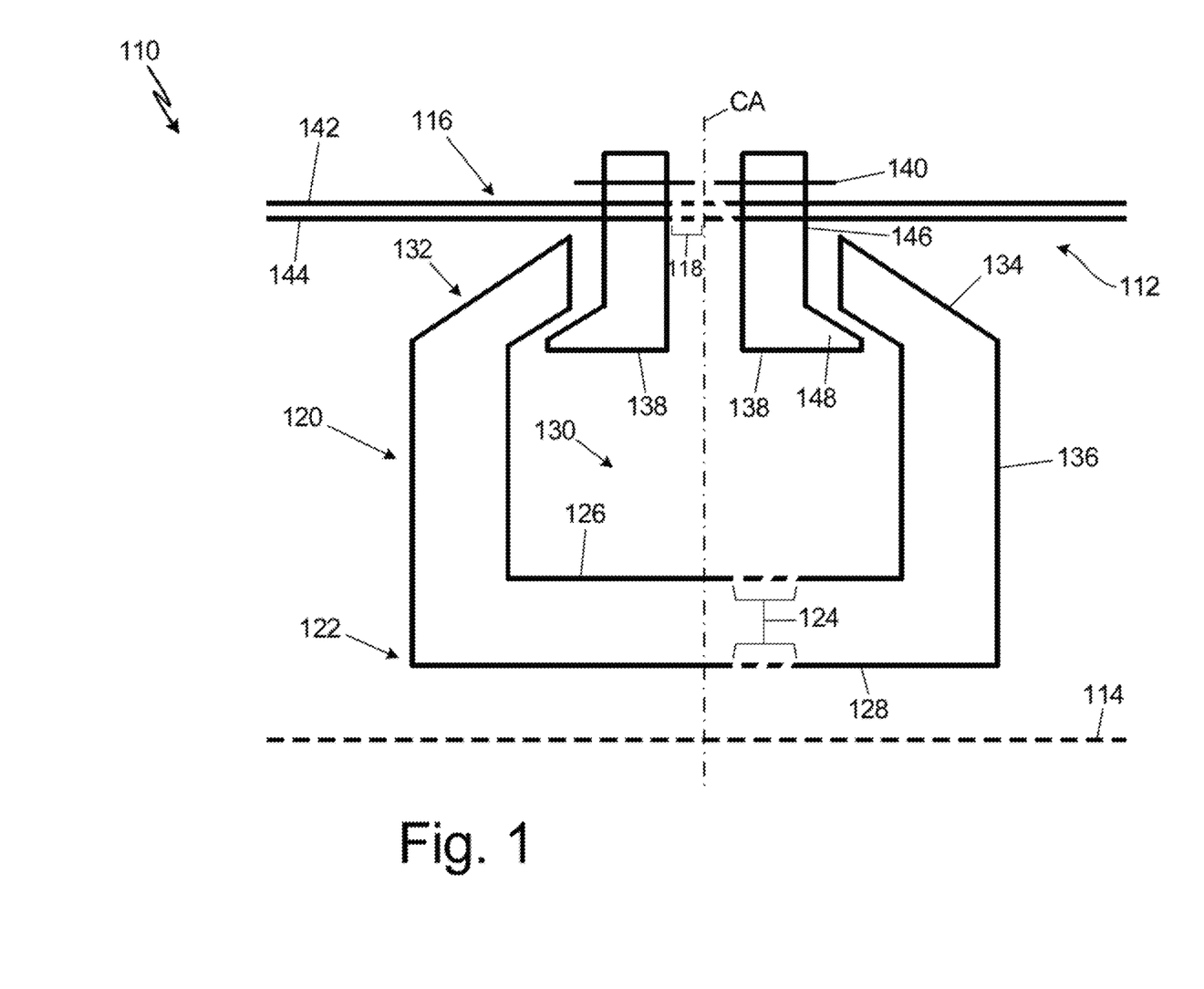
FIG. 1 is a cross-sectional view of a gas turbine engine combustor panel assembly with an inner void area.

FIG. 1 is a cross-sectional view of a gas turbine engine combustor panel assembly 10 in an engine (not pictured). Assembly 110 includes shell 112, which defines the outer boundary of combustion chamber 114. Shell 112 includes outer skin 116 with a first plurality of holes 118, and combustor panel 120. The combustor panel 120 includes a first end 122, a second plurality of holes 124, inner face 126, outer face 128, inner void 130, second end 132, dovetail interface section 134, and panel wall 136. Assembly 110 further includes plurality of dovetail connectors 138 with straight body section 146 and dovetail section 148, fasteners 140, outer face 142 of outer skin 116 and inner face 144 of outer skin 116. Assembly 110 is configured to be installed in a gas turbine engine combustor.

As discussed above, shell 112 includes outer skin 116, with first plurality of holes 118 that extend through outer skin 116 to create a flow path that continues through inner void 130 to the second plurality of holes 124 in the first end 122 of the combustor panel 120. The second plurality of holes 124 extend through inner face 126 of combustor panel 120 to outer face 128 of combustor panel 120 such that fluid may flow through first plurality of holes 118 into inner void 130 of combustor panel 120, then through second plurality of holes 124 into combustion chamber 114. Combustor panel 120 can include second end 132 of combustor panel 120, which can include dovetail interface section 134 of second end 132 extending along central axis CA and connected to panel wall 136 of second end 132. Panel wall 136 may be cored to allow for active cooling, such as is commonly done for turbine vane rails or blade outer air seals (BOAS). A plurality of dovetail tail connectors 138 extends along the central axis CA, and are configured to abut dovetail interface section 134 of second end 132 to connect the combustor panel 120 to the outer skin 116. A first plurality of fasteners 140 on outer face 142 of outer skin 116 connects straight body sections 146 of the plurality of dovetail tail connectors 138 to outer skin 116. The straight body sections 146 of the plurality of dovetail tail connectors 138 pass through outer face 142 of outer skin 116 to inner face 144 of outer skin 116, and are connected to dovetail sections 148 of the plurality of dovetail tail connectors 138. The straight body sections 146 are positioned perpendicular to surfaces 142, 144 of outer skin 116. The dovetail sections 148 of the plurality of dovetail tail connectors 138 are configured to abut dovetail interface section 134 of the combustor panel 120. Though FIG. 1 shows the dovetail section 148 extending outward and dovetail interface section 134 extend inward relative to each other, it is contemplated that this orientation can be reversed. The combustor panel 120 can be held in place with the plurality of dovetail tail connectors 138 via gravity, fluidic forces from fluid entering first plurality of holes 118 and exiting second plurality of holes 124, and via mechanical means such as fasteners 140. The fasteners 140 may be any fasteners suitable for use in a gas turbine engine and may include a Belleville washer type stack to allow for thermal expansion.

Figure 2:
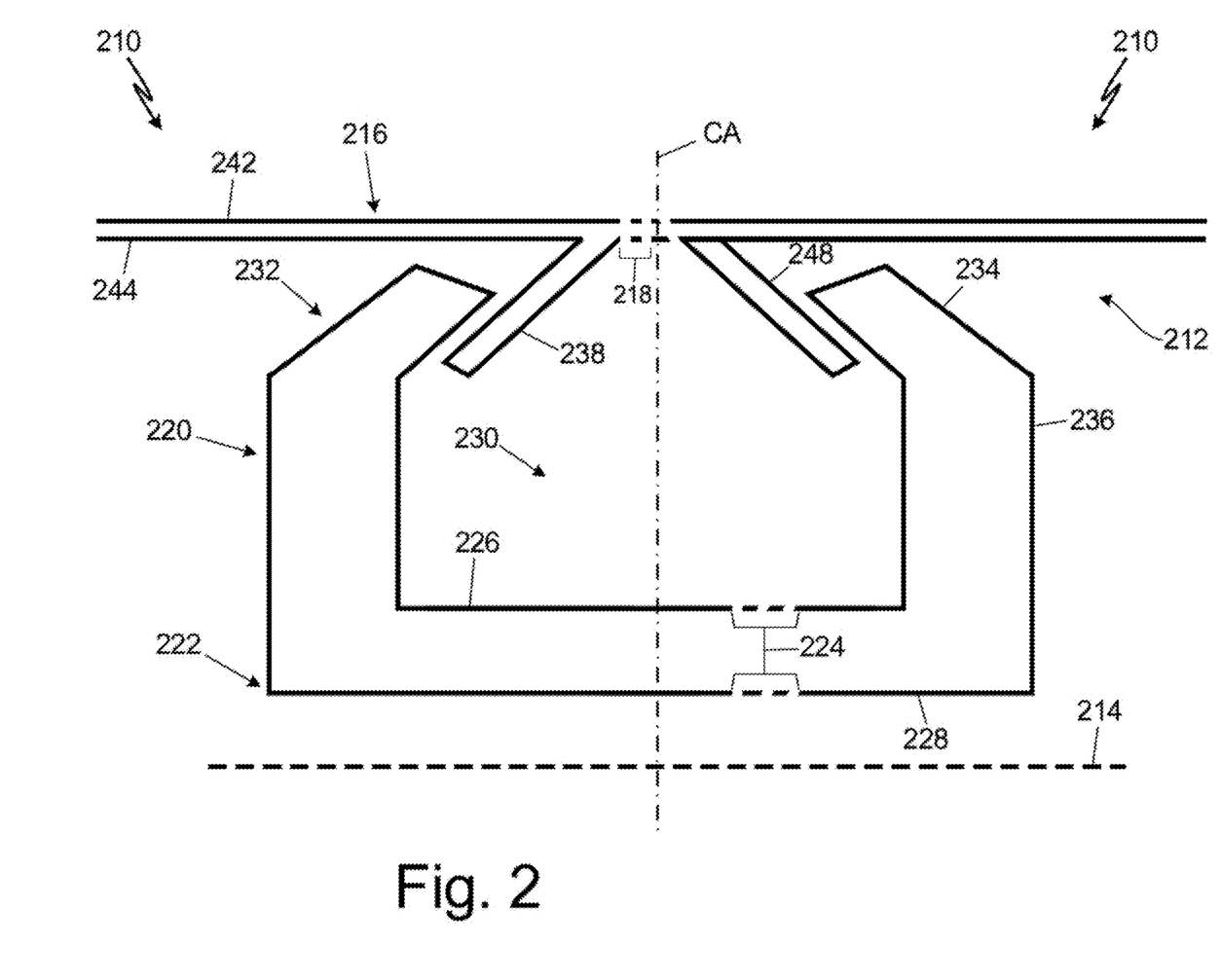
FIG. 2 is a cross-sectional view of a gas turbine engine combustor panel assembly with a plurality of dovetail tail connectors that are integral to an outer skin of a shell.

FIG. 2 is a cross-sectional view of combustor panel assembly 210 with plurality of dovetail tail connectors 238 that are integral to outer skin 216 of shell 212. For purposes of this application, "integral" means formed as a single or monolithic piece or combined as an assembly as appropriate for a particular application. Assembly 210 includes shell 212, defining combustion chamber 214. As discussed above in reference to FIG. 1, shell 212 is made of outer skin 216, with first plurality of holes 218 that extend through outer skin 216 to create a flow path that connects through inner void 230 to the second plurality of holes 224 in the first end 222 of the combustor panel 220. The second plurality of holes 224 extend through inner face 226 of combustor panel 220 to outer face 228 of combustor panel 220 such that fluid may flow through first plurality of holes 218 into inner void 230 of combustor panel 220, then through second plurality of holes 224 into combustion chamber 214. Combustor panel 220 can include second end 232 of combustor panel 220, which can include dovetail interface section 234 of second end 232 extending along central axis CA and connected to panel wall 236 of second end 232. Panel wall 236 may be cored to allow for active cooling, such as is commonly done for turbine vane rails or blade outer air seals (BOAS).

Plurality of dovetail tail connectors 238 extend along central axis CA, and abut to dovetail interface section 234 of second end 232. Connection sections 248 of plurality of dovetail tail connectors 238 extend from inner face 244 of outer skin 216. Connection sections 248 extend along central axis CA and abut against dovetail interface section 234 of combustor panel 220. It is contemplated that first plurality of holes 218 of outer skin 16 may extend through plurality of dovetail tail connectors 238 as disclosed in FIG. 2, as plurality of dovetail tail connectors 238 are integral to outer skin 216 in this disclosed embodiment.

Figure 3:
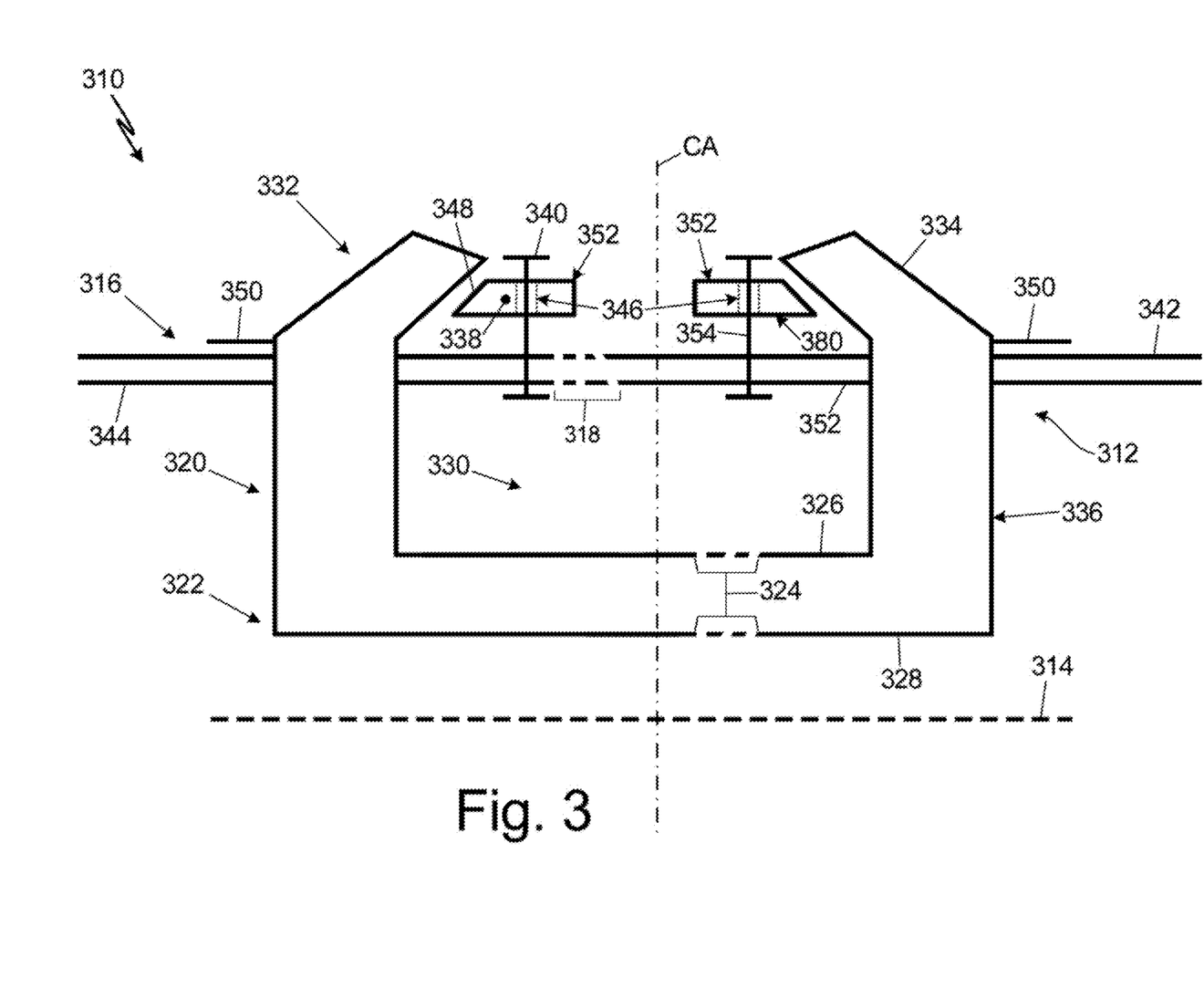
FIG. 3 is a cross-sectional view of a gas turbine engine combustor panel assembly with a plurality of dovetail tail connectors mounted in a plurality of dovetail rails.

FIG. 3 is a cross-sectional view of an exemplary embodiment of a gas turbine engine combustor panel assembly 310, hereinafter assembly 310, with plurality of dovetail tail connectors 338 integrated in plurality of dovetail rails 352.

Assembly 310 includes shell 312, defining the outer periphery of combustion chamber 314. Shell 312 is made of outer skin 316, with first plurality of holes 318 that extend through outer skin 316 to create a flow path that continues through inner void 330 to the second plurality of holes 324 in the first end 322 of the combustor panel 320. The second plurality of holes 324 extend through inner face 326 of combustor panel 320 to outer face 328 of combustor panel 320 such that fluid may flow through first plurality of holes 318 into inner void 330 of combustor panel 320, then through second plurality of holes 324 into combustion chamber 314. Combustor panel 320 can include second end 332 of combustor panel 320, which can include dovetail interface section 334 of second end 332 extending along central axis CA and connected to panel wall 336 of second end 332. Panel wall 336 may be cored to allow for active cooling, such as is commonly done for turbine vane rails or blade outer air seals (BOAS). Sheet metal seals 350 abut outer face 342 of outer skin 316 and panel wall 336 or dovetail interface section 334.

Plurality of dovetail tail connectors 338 extend along central axis CA, and are integral to dovetail rails 352. Dovetail rails 352 may be made of nickel superalloy and can be cored to allow for active cooling, such as is commonly done for turbine vane rails or blade outer air seals (BOAS). Plurality of fasteners 340 connect plurality of dovetail bolts 354 to inner face 344 of outer skin 316. Plurality of dovetail bolts 354 pass through outer skin 316, and through plurality of dovetail rails 352 at holes 346. Plurality of fasteners 340 connect plurality of dovetail bolts 354 to plurality of dovetail tail connectors 338. In FIG. 3, face 380 of plurality of dovetail rails 352 are parallel to or have the same radius as faces 342 of outer skin 316. Connection sections 348 of plurality of dovetail tail connectors 338 abut to dovetail interface section 334 of combustor panel 320.

Figure 4:
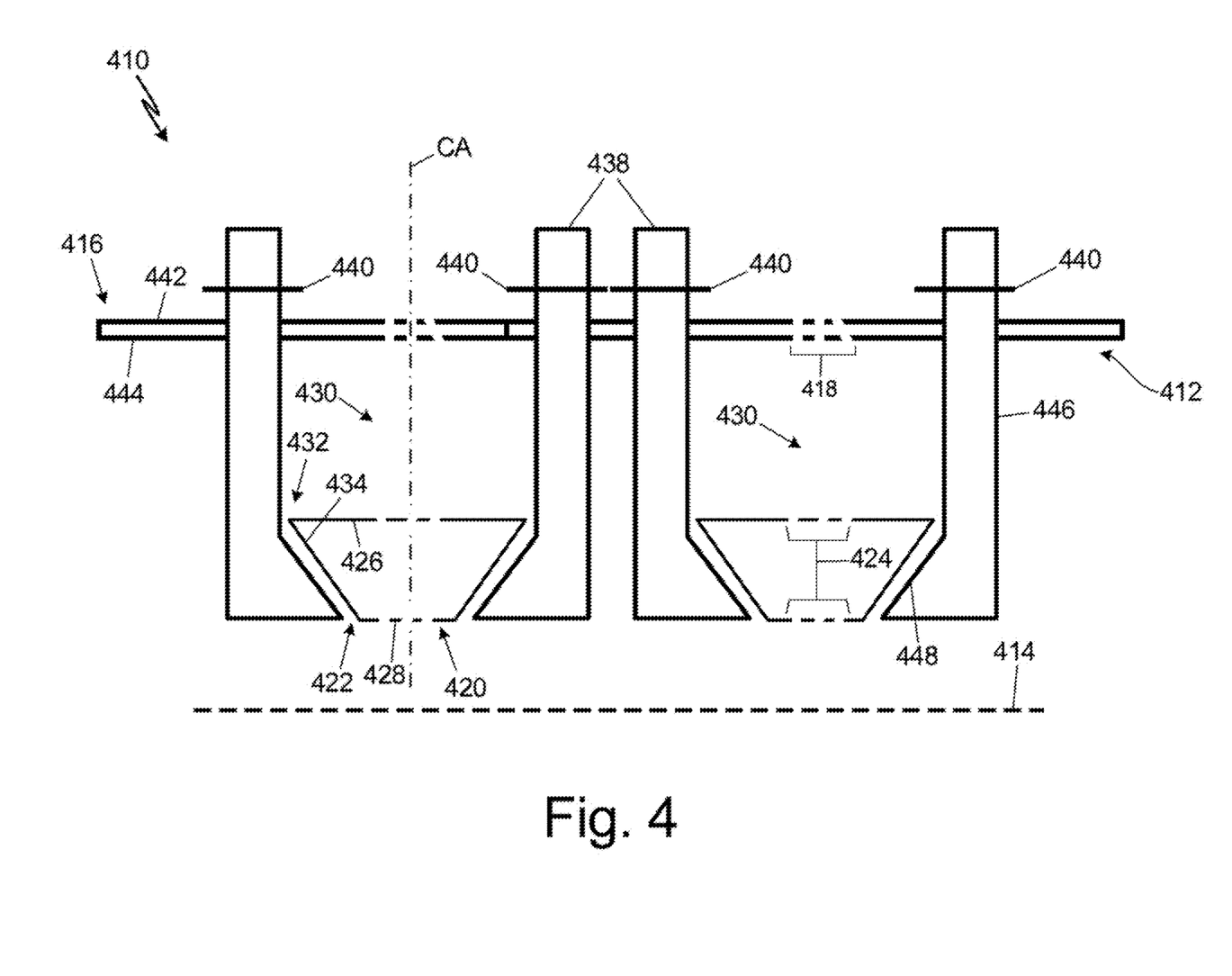
FIG. 4 is a cross-sectional view of a gas turbine engine combustor panel assembly with a plurality of combustor panels enclosed by a plurality of dovetail tail connectors except for an outer face of the combustor panel.

FIG. 4 is a cross-sectional view of an exemplary embodiment of a gas turbine engine combustor panel assembly 410, hereinafter assembly 410, with plurality of combustor panels 420 enclosed by plurality of dovetail tail connectors 438 except for an outer face 428 of combustor panel 420.

Assembly 410 includes shell 412, which defines the outer periphery of combustion chamber 414. Shell 412 is made of outer skin 416, with first plurality of holes 418 that extend through outer skin 416 to create a flow path that continues through inner void 430 to the second plurality of holes 424 in the first end 422 of the combustor panel 420. The second plurality of holes 424 extend through inner face 426 of combustor panel 420 to outer face 428 of combustor panel 420 such that fluid may flow through first plurality of holes 418 into inner void 430 of combustor panel 420, then through second plurality of holes 424 into combustion chamber 414. Combustor panel 420 can include second end 432 of combustor panel 420, which can include dovetail interface section 434 of second end 432 extending along central axis CA (pictured only on one of the combustor panels in FIG. 4) and with no panel wall. Plurality of dovetail tail connectors 438 extend along central axis CA, and abut to dovetail interface section 434 of second end 432. First plurality of fasteners 440 on outer face 442 of outer skin 416 connect straight body sections 446 of plurality of dovetail tail connectors 438 to outer skin 416. Straight body sections 446 of plurality of dovetail tail connectors 438 pass through outer face 442 of outer skin 416 to inner face 444 of outer skin 416, and are connected to connection sections 448 of plurality of dovetail tail connectors 438. Straight body sections 446 are normal to surfaces 442, 444 of outer skin 416. Straight section 446 may be cored to allow for active cooling, such as is commonly done for turbine vane rails or blade outer air seals (BOAS). Connection sections 448 of plurality of dovetail tail connectors 438 abut to dovetail interface section 434 of combustor panel 420.

The proposed dovetail attachment configurations as disclosed above will allow combustor panels 120, 220, 320 and 420 and outer skin 116, 216, 316 and 416 to be made of a variety of high temperature materials including nickel superalloys, including single crystal nickel superalloys, and ceramic matrix composites (CMCs). Combustor panel 120, 220, 320, 420, outer skin 116, 216, 316, 416, and/or plurality of dovetail tail connectors 138, 238, 338, 438 may be constructed from or otherwise include a ceramic material such as, but not limited to, a ceramic matrix composite (CMC) material. The CMC material includes ceramic fibers that are disposed in a ceramic matrix. The CMC material may be, but is not limited to, a SiC/SiC composite in which silicon carbide (SiC) fibers are disposed within a silicon carbide (SiC) matrix. The ceramic fibers may be provided in fiber plies that may be woven or braided and may collectively include plies of different fiber weave configurations. Plurality of dovetail tail connectors 138, 238, 338, 438 may be constructed from or otherwise include metals and other non-ceramic material, Examples of suitable metals include, but are not limited to, cobalt superalloys, such as Haynes 25 and Haynes 188, and nickel superalloys such as Inconel 625, Inconel 718 and single crystal nickel. Metallic dovetail tail connectors 138, 238, 338, 438 may be coated to prevent thermochemical reactions with CMC combustor panels 120, 220, 320 and 420. The non-reactive coating may contain silicon-based coating rare earth silicates, alkaline earth silicates, alkaline earth aluminosilicates, silicon, silicon oxides, silicon carbides, silicon oxycarbides, barium-magnesium aluminosilicate, mullite, hafnon, zircon, and combinations thereof.

Any of the above embodiments may be used to cover entire outer skin 116, 216, 316, 416 of shell 112, 212, 312, 412 with combustor panels 120, 220, 320, 420. Combustor panels 120, 220, 320, 420 can abut up to each other to completely shield outer skin 116, 216, 316, 416 from combustion chamber 114, 214, 314, 414.

It is understood that any of the plurality of holes can be formed at various angles deemed appropriate for a particular application to cause fluid to enter at different angles. This helps prevent debris from accumulating within the plurality of holes or within certain regions of the inner void of the combustor panels.

A dovetail attachment eliminates typical combustor panel studs, thus eliminating the distress and failure modes associated with the hot spots in the region around combustor panel studs.

Discussion of Possible Embodiments

The following are non-exclusive descriptions of possible embodiments of the present invention.

A gas turbine engine combustor panel assembly includes a shell defining an outer periphery of a combustion chamber. The shell has an outer skin with a first plurality of holes and a combustor panel, which includes a first end including a second plurality of holes on an inner face, which extend through the inner face to an outer face and are configured to allow fluid flow from the first plurality of holes to the combustion chamber. The combustor panel further includes a second end comprising a dovetail interface section extending axially from a central axis and from a panel wall of the combustor panel. The assembly further includes a plurality of dovetail tail connectors configured to extend along a central axis and interface with the second end of the combustor panel to connect the combustor panel to the shell.

The assembly of the preceding paragraph can optionally include, additionally and/or alternatively, any one or more of the following features, configurations and/or additional components:

The assembly can further include a first plurality of fasteners configured to releasably connect the plurality of dovetail tail connectors to the outer skin by passing a straight body section of the plurality of dovetail tail connectors through the outer skin before a connection section extends along the central axis to interface with the dovetail interface section of the combustor panel.

The plurality of dovetail tail connectors of the assembly can be an integral portion of the outer skin.

The plurality of dovetail tail connectors can be mounted in a plurality of dovetail rails disposed within the outer skin.

The assembly can further include a plurality of sheet metal seals configured to abut the panel wall of the combustor panel and an outer face of the outer skin.

The assembly can further include a second plurality of fasteners configured to abut an outer face of the outer skin, wherein the plurality of fasteners abut the straight body section of the plurality of dovetail tail connectors. The assembly can further include a plurality of dovetail bolts configured to connect to the second plurality of fasteners, pass through the outer skin, pass through the plurality of dovetail tail connectors, and connect to the first plurality of fasteners.

The assembly can further include a first plurality of fasteners configured to releasably connect the plurality of dovetail tail connectors to the outer skin by passing a straight body section of the plurality of dovetail tail connectors through the outer skin before a connection section extends along the central axis, and the combustor panel is enclosed by the plurality of dovetail tail connectors except for the outer face of the combustor panel.

The combustor panel can be made of a densified laminated ceramic matric composite (CMC) material.

The CMC material of the preceding paragraph can comprise silicon carbide (SIC) fiber plies disposed in a silicon carbide (SiC) matrix.

The combustor panel can be actively cooled.

The second plurality of holes can be oriented at an angle from the inner face of the combustor panel.

The combustor panel can have an inner void area configured to provide an air gap between the outer skin and the combustor panel.

The first plurality of holes can be oriented at an angle from an inner face of the outer skin.

The assembly can include cooling fluid that is configured to be directed into the first plurality of holes.

A combustor panel arrangement for use in a combustor in a gas turbine engine includes a shell defining a combustion chamber, the shell having an outer skin with a first plurality of holes and further including a first combustor panel with a first end including a second plurality of holes on an inner face of the first combustor panel through to an outer face of the first combustor panel, and configured to allow fluid flow from the first plurality of holes to the combustion chamber, and a second end comprising a dovetail interface section extending along central axis and from a panel wall of the first combustor panel. The shell further includes a second combustor panel with a first end including a second plurality of holes on an inner face of the second combustor panel through to an outer face of the second combustor panel, and configured to allow fluid flow from the first plurality of holes to the combustion chamber, and a second end comprising a dovetail interface section extending along central axis and from a panel wall of the second combustor panel. A plurality of dovetail tail connectors are configured to extend along the central axis and interface with the second end of the first combustor panel, and the second end of the second combustor panel.

The arrangement of the preceding paragraph can optionally include, additionally and/or alternatively, any one or more of the following features, configurations and/or additional components:

The assembly can further include a first plurality of fasteners configured to releasably connect the plurality of dovetail tail connectors to the outer skin by passing a straight body section of the plurality of dovetail tail connectors through the outer skin before a connection section extends along the central axis to interface with the dovetail interface section of at least one of the combustor panels.

The plurality of dovetail tail connectors can be an integral portion of the outer skin.

The plurality of dovetail tail connectors of the preceding paragraph can be mounted in a plurality of dovetail rails disposed within the outer skin.

The assembly can further include a plurality of sheet metal seals configured to abut the panel wall of at least one of the combustor panels and an outer face of the outer skin.

The assembly can further include a second plurality of fasteners configured to abut an outer face of the outer skin, wherein the plurality of fasteners abut the straight body section of the plurality of dovetail tail connectors. The assembly can further include a plurality of dovetail bolts configured to connect to the second plurality of fasteners, pass through the outer skin, pass through the plurality of dovetail tail connectors, and connect to the first plurality of fasteners.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine combustor panel assembly comprising:
   a shell defining an outer periphery of a combustion chamber, the shell having an outer skin with a first plurality of holes;
   a combustor panel, the combustor panel comprising:
      a first end including a second plurality of holes on an inner face of the combustor panel extending through the inner face to an outer face of the combustor panel, and configured to allow fluid flow from the first plurality of holes to the combustion chamber;
      a second end comprising a dovetail interface section extending from a panel wall of the combustor panel towards a central axis; and
      a plurality of dovetail tail connectors configured to extend along the central axis and interface with the second end of the combustor panel to connect the combustor panel to the shell.

2. The assembly of claim 1 further comprising a first plurality of fasteners configured to releasably connect the plurality of dovetail tail connectors to the outer skin by passing a straight body section of the plurality of dovetail tail connectors through the outer skin wherein a connection section extends away from the central axis to interface with the dovetail interface section of the combustor panel.

3. The assembly of claim 1, wherein the plurality of dovetail tail connectors are an integral portion of the outer skin.

4. The assembly of claim 3, wherein the plurality of dovetail tail connectors are mounted in a plurality of dovetail rails disposed within the outer skin.

5. The assembly of claim 4, further comprising a plurality of sheet metal seals configured to abut the panel wall of the combustor panel and an outer face of the outer skin.

6. The assembly of claim 4 further comprising:
   a second plurality of fasteners configured to abut an outer face of the outer skin, wherein the second plurality of fasteners abut straight body sections of the plurality of dovetail tail connectors;
   a plurality of dovetail bolts configured to connect to the second plurality of fasteners, pass through the outer skin, pass through the plurality of dovetail tail connectors, and connect to a first plurality of fasteners.

7. The assembly of claim 1 further comprising a first plurality of fasteners configured to releasably connect the plurality of dovetail tail connectors to the outer skin by passing a straight body section of the plurality of dovetail tail connectors through the outer skin wherein the straight body section connects to a connection section that extends along the central axis, and wherein the combustor panel is enclosed by the plurality of dovetail tail connectors except for the outer face of the combustor panel.

8. The assembly of claim 1, wherein the combustor panel is made of a densified laminated ceramic matric composite (CMC) material.

9. The assembly of claim 8, wherein the CMC material comprises silicon carbide (SiC) fiber plies disposed in a silicon carbide (SiC) matrix.

10. The assembly of claim 1, wherein the combustor panel is actively cooled.

11. The assembly of claim 1, wherein the second plurality of holes are oriented at an angle from the inner face of the combustor panel.

12. The assembly of claim 1, wherein the combustor panel has an inner void area configured to provide an air gap between the outer skin and the combustor panel.

13. The assembly of claim 1, wherein the first plurality of holes are oriented at an angle from an inner face of the outer skin.

14. The assembly of claim 1, wherein cooling fluid is configured to be directed into the first plurality of holes.

15. A combustor panel arrangement for use in a combustor in a gas turbine engine, comprising:
   a shell defining a combustion chamber, the shell having an outer skin with a first plurality of holes and further comprising:
      a first combustor panel with a first end including a second plurality of holes on an inner face of the first combustor panel through to an outer face of the first combustor panel, and configured to allow fluid flow from the first plurality of holes to the combustion chamber, and a second end comprising a dovetail interface section extending along a first central axis and from a panel wall of the first combustor panel;
      a second combustor panel with a first end including a second plurality of holes on an inner face of the second combustor panel through to an outer face of the second combustor panel, and configured to allow fluid flow from the first plurality of holes to the combustion chamber, and a second end comprising a dovetail interface section extending along a second central axis and from a panel wall of the second combustor panel;

a plurality of dovetail tail connectors configured to extend along the first and second central axis and interface with the second end of the first combustor panel, and the second end of the second combustor panel; and a first plurality of fasteners configured to releasably connect the plurality of dovetail tail connectors to the outer skin by passing a straight body section of the plurality of dovetail tail connectors through the outer skin, wherein the straight body section connects to a connection section that extends along the first or the second central axis to interface with the dovetail interface section of at least one of the combustor panels.

16. The assembly of claim 15, wherein the plurality of dovetail tail connectors are an integral portion of the outer skin.

* * * * *